United States Patent

[11] 3,607,393

| [72] | Inventors | Ronald R. Gabel<br>Western Springs, Ill.;<br>Robert M. Hamilton, Minnetonka, Minn.;<br>Wayne E. Dudacek, Lyons, Ill. |
|---|---|---|
| [21] | Appl. No. | 692,320 |
| [22] | Filed | Dec. 21, 1967 |
| [45] | Patented | Sept. 21, 1971 |
| [73] | Assignee | CPC International Inc. |

[54] METHOD OF PREPARING A FOOD BATTER STARCH
10 Claims, No Drawings

[52] U.S. Cl. ............................................ 127/32, 99/107, 127/70
[51] Int. Cl. ............................................ C13l 1/08
[50] Field of Search ............................................ 127/70, 71, 32, 33

[56] References Cited
UNITED STATES PATENTS

| 2,343,048 | 2/1944 | Eble ............................ | 127/70 |
| 3,208,851 | 9/1965 | Antinori ...................... | 99/1 |
| 3,317,346 | 5/1967 | Kibbel ......................... | 127/70 |

OTHER REFERENCES

Therald Moeller, " Inorganic Chemistry," p. 439, John Wiley and Sons, Inc., New York, 1952.

" Hackh's Chemical Dictionary" J. Grant, ed., p. 421, Mc-Graw-Hill, Book Co., Inc. New York, 1944.

*Primary Examiner*—Morris O. Wolk
*Assistant Examiner*—Sidney Marante
*Attorneys*—Frank E. Robbins, James L. Bailey, Janet E. Price, Robert D. Weist and Martha A. Michaels

ABSTRACT: Method of preparing a starch useful as a batter mix to prepare breaded, deep-fried foods. Particularly covers a method of preparing a batter starch by treating an acidic aqueous slurry of raw starch with a mixture of hypohalogenous acid and halogen, followed by treatment with an oxidizing agent. In a preferred embodiment an alkali metal hypohalite such as sodium hypochlorite is the treatment agent in the first step and the oxidizing agent is hydrogen peroxide. The resultant starch when used as a batter mix results in a fried batter coating displaying a high degree of adhesion and cohesion.

METHOD OF PREPARING A FOOD BATTER STARCH

Deep-fried food batters whether used with fresh or frozen foods normally comprise starch along with a variety of other ingredients such as egg solids, corn meal, salt, preservatives, seasonings, coloring matter, etc. The starch and other optional materials are combined with water to produce a coating of appropriate viscosity, and the viscous solutions or slurries are then bedded to the food by means of dip, spray or cascade techniques. The batter coated food is then coated with a breading such as corn meal, cracker crumbs, bread crumbs or the like.

The terms "batter starch" or "breading starch" are often used in a synonymous manner to designate a starch product utilized in the just described manner. For sake of convenience, the term "batter starch" will be employed hereinafter to designate the role of the starch of the invention.

The excess breading is then shaken free, and the breaded foodstuff is deep fried by being immersed in a hot cooking oil such as corn oil, peanut oil or any other commonly employed food oil as desired. The thus prepared food may be immediately consumed or packaged and quick frozen, whereupon the ultimate consumer may prepare the foodstuff merely by reheating. In some cases the foods may receive only a partial cooking or "prefrying" at this point, whereupon it is packaged and quick frozen. The partially cooked frozen foodstuff is then completely cooked by the consumer.

An important quality that breaded batters must display is adhesion to the foodstuffs to which they are supplied. Many prior art batters lack adhesion in the relative sense as evidenced by their pronounced tendency to pull away from the foodstuff subsequent to the breading and deep-frying operation. In some instances the breaded batter has so little adhesion that it is literally stripped away clean from the surface of the foodstuff. Likewise, many prior art breaded batter coatings have very poor cohesion and poor film strength, whereupon the breaded batter coating crumples and disintegrates when handled or eaten.

One proposed method of preparing a batter starch involves treatment of the granular starch in slurry form with sodium hypochlorite. This is in turn followed by treatment with sodium bisulfite. While starches prepared by this procedure do exhibit increased adhesion and cohesion when compared to the starting starch, they nevertheless do not possess that high degree of adhesion property ultimately sought after.

It therefore becomes an object of the invention to provide an improved batter starch. Another object of the invention is to provide a method of preparing a starch useful as a batter mix composition which may be applied as a coating during preparation of breaded, deep-fried foods.

A still further object of the invention is to provide a food batter starch which exhibits superior adhesion when applied to fresh or frozen foods, and likewise displays excellent cohesion.

A specific object of the invention is to provide a method of preparing a breaded, deep-frying foodstuff by application of a novel batter starch.

Other objects will appear hereinafter.

In accordance with the invention a novel method of preparing an improved starch batter composition has been discovered. In the broad sense, this process comprises the steps of treating an aqueous raw or granular starch slurry with a mixture of hypohalogenous acid and halogen gas, followed by addition to the thus treated starch slurry of an oxidizing agent such as hydrogen peroxide. The thus produced starch batter displays excellent adhesion when applied to frozen or fresh foodstuffs and also exhibits superior cohesion in terms of film strength.

The first step in the invention involves preparation of a suitable aqueous starch slurry. All that is necessary here is to disperse starch in an aqueous medium, and maintain said starch dispersion by means of agitation. The solids content of the starch slurry may vary over a considerable range. However, the best practice of the invention indicates that the slurry should contain from about 10 to about 50 percent by weight of solids, and more often the starch solids content should range from about 20 to about 40 percent by weight based on total slurry weight.

The starch material may be derived from both cereal and tuber starches. For example, the starches may be derived from such sources as tapioca, corn, high amylose corn, wheat, potato, waxy maize, sorghum, sago or rice. It should also be noted that cereal flours containing amylaceous materials, i.e. starches, are also for the purposes of the invention fully equivalent to starches. These flours may be derived from such sources as wheat, corn or potatoes.

One or more of the above starches in raw or granular form are made up into an aqueous slurry, and thereafter treated with the mixture of hypohalogenous acid and halogen gas. During treatment, the pH of the slurry is maintained within the range of 1–8, and more often the pH of the starch slurry undergoing treatment ranges from about 2 to about 6. In the most typical situations, the pH of the starch slurry undergoing treatment will range from about 2 to about 4. The pH adjustment may be effected in a number of ways. Usually, the aqueous slurry of starch is first prepared, and prior to treatment the pH adjusted within the above ranges by addition, if necessary, of mineral acids such as hydrochloric, sulfuric, phosphoric, or nitric acids. In another variation, the pH is correctly adjusted by addition of appropriate amounts of acid while treatment is actually being effected. In any event, all that is necessary is to maintain the pH within the appropriate range in some manner.

The treatment of starch with hypohalogenous acid and halogen gas may be carried out in a number of varying ways. For example, an alkali metal hypohalite such as sodium hypochlorite may be added to the aqueous starch slurry. As mentioned above, the slurry may be already acidified, or appropriate amounts of acid may be added to the starch slurry during hypohalite addition. Typical alkali metal hypohalites useful here include sodium, calcium, lithium, potassium, etc. hypochlorite, hypobromite or hypofluorite. Preferred for use in the present invention, due to advantages of cost and availability is sodium hypochlorite.

The amount of time it takes to add the alkali hypochlorite to the aqueous starch slurry is not particularly critical. This normally depends on the size of the batch and other variables involved and particularly whether the operation is batchwise or continuous. For example, in a typical laboratory run the alkali metal hypohalite may be added over a period of time of about 1 minute or so. On the other hand, in a pilot plant run involving considerably more total volume of reaction mixture, the period of addition of hypohalite may range as high as 45 minutes or more. Normally, the hypohalite is added over a period of time ranging from 1 minute or less to about 120 minutes. Again, this may vary outside this range depending upon factors enumerated above.

The amount of alkali hypochlorite added to the starch starting material usually should be that amount sufficient to supply or release 0.05–5.50 percent halogen gas based on starch solids and calculated as chlorine.

In some instances it may be desirable to hold the thus hypochlorite-treated starch slurry for a period of time prior to addition of oxidizing agent. This time period again will vary depending upon how the process is effected. In one series of runs the hypochlorite treated starch slurry was held for a period of time ranging from about 5 to about 120 minutes at a temperature ranging from about 20 to about 60° C. More often the hold time, if desired, ranges from about 5 to about 45 minutes, and the holding temperature ranges from about 20+ to about 45° C. It should be noted that this same temperature range is appropriate for effecting hypochlorite addition. Agitation of the slurry should be maintained both during hypohalite treatment and the holding period. Mild agitation is sufficient here. If a continuous process is carried out the holding time may only be a few seconds.

Under acidic conditions the alkali metal hypohalite such as sodium hypochlorite forms hypohalogenus acid and halogen gas in various proportions depending upon the acidity. Usually below about pH 6 the hypohalite no longer exist in such form in appreciable amounts, but substantially forms the acid and halogen gas. With specific respect to sodium hypochlorite, though equally true with the other alkali metal hypohalites, the higher the pH the greater the proportion of hypochlorous acid formed. Conversely, the lower the pH the greater the proportion of chlorine gas that is produced. Thus, the respective proportions of hypochlorous acid and chlorine used as the treatment mixture here will depend upon the particular pH range over which the reaction is run.

By way of illustration, if the reaction is run at a pH of 2.5 approximately equal molar amounts of hypochlorous acid and chlorine gas are formed. At a pH of 5–6, most of the sodium hypochlorite is in the form of hypochlorous acid in equilibrium with sodium hypochlorite, with minimal amounts of chlorine gas being present. Again, at a pH of about 2 no hypochlorite ions are present and the mixture of hypochlorous acid and chlorine gas is in the ratio of 0.3 mole of hypochlorous acid and 0.7 mole of chlorine gas. As noted above, the treatment may be suitably effected over the entire acidic range. However, we have found that best results in terms of achieving a final starch batter mix which displays exceptionally high adhesion when applied to frozen or fresh foodstuffs is made by treating the starch in this step at a pH less than about 6.

Still other ways of generating a mixture of hypohalogenous and halogen gas are available. For example, a suitable alkali metal hypohalite such as sodium hypochlorite may be generated in situ, whereupon in the acid environment hypochlorous acid plus chlorine are formed. Thus, an acidic slurry of starch may be formed which contains sodium chloride. Upon exposure to an electrical current sodium hypochlorite is formed and correspondingly in the acid environment hypochlorous acid and chlorine are generated. Again, the just named mixture of reagents may be made by bubbling chlorine into an acidic aqueous slurry containing starch.

Thus, any method which provides a mixture of hypohalogenous and halogen gas used to appropriately treat starch may be utilized here without departing from the scope of the invention. Again, the proportion of hypohalogenous acid to halogen gas, regardless of the method utilized to prepare these, will depend largely upon the treatment PH range.

The amount of time, temperature employed, etc. as set out above with respect to addition of alkali metal hypohalite are equally applicable in the just mentioned alternate modes of treatment. Modification of starch via alkali metal hypohalite addition is preferred primarily for reasons of economy and simplicity.

After the granular raw starch has been treated essentially in the manner set out above, an oxidizing agent is then added to the treated starch slurry. In reality, the added oxidizing agent though conventionally effective as oxidizing in most reactive situations, acts as a reducing agent in this particular environment. That is, the previous treatment with hypohalogenus acid and halogen gas was via a relatively strong oxidizing reaction. Thus, any other added oxidizing agent in a relative sense acts as a reducing agent to essentially discharge residual halogen content present. However, for sake of simplicity and convention these conventional oxidizing agents will be referred to as such hereafter.

For example, if sodium hypochlorite is added in the initial step of the invention, excess chlorine is released which must be neutralized in terms of a redox reaction by addition of an appropriate reagent. Thus, for example, such conventional oxidants as ammonium, sodium or potassium periodates or persulfates, hydrogen peroxide, or other like oxidizing agents may be employed here. Preferred for use in the present invention is hydrogen peroxide. This appears to give excellent results in terms of reducing chlorine content and achieving a food-breading starch which has excellent adhesion and cohesion.

The amount of oxidizing agent such as hydrogen peroxide which may be added to the sodium hypohalite treated starch slurry may vary over a wide range. In some instances an equivalent amount of oxidizing agent is added to just neutralize in terms of the redox reaction the excess halogen present such as chlorine. In other instances, the amount of oxidizing agent added is materially less than that needed to completely neutralize the excess dissolved halogen gas present. Further, the amount of oxidizing agent may be manyfold times that necessary to neutralize the chlorine or other halogen gas which is present here as introduced through hypohalite addition. For example, in some instances, up to about 10 times the amount of oxidizing agent theoretically necessary to neutralize chlorine may be added. Yet, it has been noted that even though gross amounts of oxidizing agent are added, or an amount less than that theoretically necessary to neutralize dissolved halogen gas, the efficiency of the food-breading starch is not lowered to any substantial degree in terms of the desirably achieved adhesion factor.

For example, in one particular run, one gallon of 35 percent hydrogen peroxide was added to a 5,500 gallon batch of sodium hypochlorite treated starch slurry containing 37 percent starch solids. Even with this minimal additive amount of oxidizing agent, excellent results were achieved in terms of producing a batter starch having excellent adhesion to such foodstuffs as fish and the like. Again, presence of excess oxidizing agent does not adversely affect adhesion rating.

The amount of time necessary to effect addition of the oxidizing agent will greatly vary depending upon the particular starch undergoing treatment, the type of treatment utilized and treatment levels employed various times involved in the overall processing, etc. As an illustrative situation, the oxidizing agent may be added over a period of time ranging from about a few seconds to about 60 minutes, and usually the addition is completed in a period of time ranging from about 1 to about 30 minutes. The starch slurry should also be gently agitated during the addition of oxidant.

In summary, the total elapsed time to complete the process will extensively vary, particularly depending on whether it is run in batches or continuously, and the manner in which halogen gas and hypohalogenus acid are generated. Thus, the total reaction time may range from say a few seconds up to 5 hours or so, but usually takes 5–60 minutes.

In a preferred embodiment of the invention, the finally treated starch slurry is then adjusted to within a rather narrow pH range. This is carried out in order to prevent hydrolysis of the starch materials, which hydrolysis in the usual situation decreases adhesion of the batter starch to frozen or fresh foodstuffs. Normally, the pH is adjusted within the range of 5–7, and most often the pH of the starch product as marketed will range between 5.5 and 6.0. Any type of base may be utilized here. For example, both sodium and potassium hydroxides and carbonates may be used to adjust the pH within the appropriate range. We have discovered that adhesion values are materially higher when potassium bases, and particularly potassium hydroxide, are used in the final step here, in comparison to use of sodium bases. To date, no reasonable explanation has been advanced to explain the enhanced effect derived through use of the potassium basic substances.

In another preferred embodiment of the process of the invention the finally treated starch is diluted to 15–30 percent solids, typically 16° Baumé, and then passed through silk screens. The filtered starch solids are then dried to a moisture content less than about 14 percent, and typically to 6–12 percent, and sold as a dry product. For example, the starch may be dried on a belt drier, a screen belt drier or by an air blower or via dual treatment of this type. In one specific embodiment of the invention, the finally treated granular starch may be spray dried to give an excellent product for use as a food-breading starch. In some instances it may be desirable to dry the product to still lower moisture in one or more drying steps.

In order to actually prepare the batter mixes of the invention the practitioner need merely make an aqueous slurry of the above described starch material. This slurry may contain from 100 to 150 parts, by weight, of water per 100 parts of starch. The precise starch: water ratio will, of course, depend upon the type of foodstuff being prepared, the manner in which the batter starch is to be applied, as well as being dependent upon the particular starch being utilized. The starch slurry is then kept under agitation prior to its application to the foodstuff so as to prevent the starch from settling out. The batter starch may thereupon be applied to the foodstuff, which may either be frozen or fresh, by any convenient procedure such as dipping, spraying or cascading. After draining off the excess batter, the breading is applied and the foodstuff may then be deep fried. It should be noted that it is unnecessary to heat the starch slurry prior to its application to the foodstuff. Those skilled in the art may add seasoning, egg solids, mild solids, corn meal, baking powder or food colors to the batter mix slurry as are desired; although, in most cases, such additives are not needed. The resultant breaded, deep-fried foodstuffs made with the batter mixes of the invention are, in all cases, characterized by the golden brown color and the smooth, even texture of their breaded coatings, which are always notably free from any crumbling or disintegration during their subsequent handling and eating.

In an alternate method, the batter mix starches here may be applied turkey foodstuffs by means of a dusting procedure wherein the dry starch is mixed with breading and seasonings and directly applied to the surface of wet foodstuffs which are then deep fried, pan fried or baked. The starch batter mix compositions described herein may be prepared and used in the aforedescribed manner by manufacturers of deep-fried, frozen food products as well as by restaurants and housewives who may utilize it for the point-of-use deep frying of all fresh and frozen foodstuffs. The starch batter mix compositions of the invention may thus be used in the preparation of all types of deep frying of fresh and frozen foodstuffs including fish, shell fish, poultry, meat and vegetable products including fish sticks, fish fillets, fish steaks, whole fish, scallops, oysters, clams, shrimps, lobster parts, chicken and turkey parts, veal, pork, beef, eggplant and onion rings.

The batter mixes described for use in breaded, deep-fried foods appear to have vastly superior properties, particularly in terms of adhesion, compared to those batter mixes made from ordinary starches or flours. Thus, the batter mix compositions of the invention display a degree of adhesion to deep-fried foods which is extremely tenacious. The batter mix once applied actually makes the breaded batter coating such as to make it an integral component of the foodstuff. The degree of adhesion is so intense that it virtually becomes impossible to remove the deep-fried, breaded batter from the treated foodstuff without actually pulling off a portion of the foodstuff along with the breaded batter. Moreover, as an extra advantage, the starch batter mixes of the invention possess a highly cohesive film strength which is resistant to the high temperatures of the deep-frying operation. This high degree of cohesiveness on the part of the breaded batters prepared with the herein described starch batter mixes, allows the resultantly treated deep-fried foodstuffs to retain their breaded batter mix coatings as a continuous entity or continuous and cohesive coating, which is completely free from any undesirable crumbling or disintegration.

The following examples illustrate typical methods of effectuating the aims of the invention in producing starch batters having superior adhesion properties when applied to frozen or fresh foodstuffs.

EXAMPLE I

A granular starch was prepared as an aqueous 22° Baumé slurry containing 100 grams starch, dry basis. To the agitated slurry of granular starch was added 0.25 grams of chlorine in form of sodium hypochlorite. During the hypochlorite addition dilute hydrochloric acid was added to maintain the pH between 3.0 and 4.0. After addition of sodium hypochlorite the slurry was held at 48° C. with agitation for one-half hour. Then a solution of hydrogen peroxide was added in an amount approximately equal to remove the residual chlorine. Here, approximately 1 ml. of a 3 percent aqueous solution of hydrogen peroxide was added. The pH was then adjusted to between 5 and 7 by the addition of powdered sodium carbonate.

EXAMPLE II

The above produced food batter starch described in example I was then tested for its adhesion property, particularly in connection as a food breading batter for fish according to the procedure set out below.

Ninety grams of the above starch was mixed with 120 ml. of water and 6 grams of sodium chloride to constitute a smooth slurry. Three blocks of frozen fish were uniformly and completely coated with the slurry by dipping. The batter-coated fish was then rolled in a cracker crumb breading mix. The breaded fish pieces were placed in a wire basket and then submerged in a deep fryer at 185° C. The breaded fish was fried until it came to the surface. Ten seconds additional frying was allowed before the basket was removed from the fryer, excess oil drained therefrom, and the fish placed on dry absorbent toweling.

Each piece of the cooked fish was stood on its long edge and cut through from top to bottom. The cut piece was opened like a book, and the meat fibers scraped from the coating. Adhesion was determined by noting the relative surface area that retained the meat fibers on all three test pieces of fish. The adhesion rating was reported as the percent of the area of the coating to which the fish fibers adhered.

The batter starch prepared according to the directions of example I had excellent adhesion with respect to the fish-breading adhesion-rating test just outlines. In the majority of the situations the starch batter had a fish-breading adhesion rating of greater than 90 percent, well over the accepted minimum standard.

EXAMPLE III

Here a large scale run was made in accordance with the process of the instant invention as follows:

20,100 pounds of starch (dry substance), was prepared as an aqueous slurry having a 22.6° Baumé and a pH of 4.8. To the starch, held at a temperature of 45° C. was added 4.0 gallons of muriatic acid to adjust the pH of the starch to 2.05. The time of acid addition was approximately 8.0 minutes.

5.2 gallons of sodium hypochlorite was diluted with water to a total of 250 gallons and then added to the acid starch slurry over a total time of 48 minutes. Sufficient sodium hypochlorite was added to produce 0.33 percent available chlorine. In order to maintain the pH between a range of 3.0 and 3.5 during the sodium hypochlorite addition 5.75 gallons of additional muriatic acid was added. The pH at the end of the sodium hypochlorite addition was 3.2.

Thereafter, 2.0 gallons of a 17.5 hydrogen peroxide solution was added. The hydrogen peroxide was added after holding the sodium hypochlorite treated starch for approximately 14 minutes after all the sodium hypochlorite had been added. The pH after addition of hydrogen peroxide was 3.0 and this was then adjusted to 6.0 with soda ash.

The above food batter starch exhibited excellent adhesion to fresh and frozen foodstuffs such as fish, and also had good cohesion property. Specifically, a number of runs were carried out as just outlined above and the resultant batter starches dried by various means such as on a belt dryer or via a flash dryer. The average percent adhesion using the test described in example II ranged from 87 to 99, all exceeding the minimum acceptable value of 85 percent adhesion.

EXAMPLE IV

A number of other runs were made wherein sodium hypochlorite was added to starch samples in varying levels, held thereafter throughout divergent durations of time, and at differing pH levels. In some instances a hydrogen peroxide oxidant was added, and in others no hydrogen peroxide was utilized as a final treatment step. The hypochlorite addition time in all instances was 1 minute and temperature of reaction was 45° C. Results are as follows:

TABLE I

| Sample No. | pH | Percent Cl on D.S. starch | Time (hr.) | Adhesion rating | |
|---|---|---|---|---|---|
| | | | | NoH$_2$O$_2$ | H$_2$O$_2$ |
| 1 | 2.4 | 0.20 | ¼ | 83 | 92 |
| 2 | 2.4 | 0.30 | ¼ | 81 | 87 |
| 3 | 3.4 | 0.30 | ¼ | 93 | 98 |
| 4 | 3.4 | 0.30 | ¾ | 95 | 100 |

As can be seen in all instances better adhesion ratings were achieved with those batter starches prepared with a final step of hydrogen peroxide-oxidant addition.

EXAMPLE V

In this sequence of tests, batter starches were prepared by employment of sodium hypochlorite followed by sodium bisulfate treatment. Again the pH was varied, as well as reaction time and amount of chlorine added, based on the starch solids. The adhesion ratings attained by use of sodium hypochlorite and sodium bisulfite treatment ranged from about 10 to about 50 percent lower compared to those ratings obtained from batter starches made in like runs except involving a sodium hypochlorite-hydrogen peroxide treatment. Use of an oxidizing agent such as hydrogen peroxide compared to the customarily employed sodium bisulfite gave surprisingly efficient results in terms of enhanced adhesion ratings.

EXAMPLE VI

Here, sodium hypochlorite was generated in situ which in turn under the acid condition of the experiment formed hypochlorous acid and chlorine.

Specifically, 200 grams (d.s.) of corn starch was made up in water to yield a 16° Baumé slurry. To this was added 8 grams of sodium chloride. Platinum electrodes were then introduced into the slurry which was continuously agitated throughout the entire run. The pH of the slurry was then adjusted to 3.5 and direct current at 2 amperes and 10 volts was applied to the electrodes for 20 minutes. After the current was stopped, 5 minutes of additional time was allowed before 10 ml. of a 0.3 percent hydrogen peroxide solution was added. The pH was adjusted to 6.0, the slurry was screened, filtered, washed and dried in a forced air dryer.

The food batter starch produced above was then tested for its adhesion property according to the procedures set out above. The starch The food batter starch produced above was then tested for its adhesion property according to the procedures set out above. The starch batter had a fish breading adhesion rating of 100 percent. The parent starch, on the other hand, had an adhesion rating of 15 percent.

EXAMPLE VII

In this series of runs chlorine gas was introduced into an acidic corn starch slurry to produce a treatment mixture of chlorine and hypochlorous acid.

In particular, 100 gram samples of corn starch were slurried in water and adjusted to an initial pH as indicated in the table below. A measured amount of chlorine gas was introduced to the agitated starch slurries by means of a 100 ml. hypodermic syringe. The reactions were allowed to proceed 15 minutes, after which time 5 ml. of 0.3 percent hydrogen peroxide was added to react with the excess chlorine present after addition of the latter via the initial step of the invention. The slurries were adjusted to pH 6.0 with soda ash, the treated starch samples filtered, washed and dried in a forced air dryer. Fish batter starches were prepared and tested for their adhesion property. Results are shown in table II below.

TABLE II

| Run No. | pH | | Chlorine added | | Adhesion rating |
|---|---|---|---|---|---|
| | Initial | End of reaction | Ml. | Percent based on dry substance starch | |
| I | 5.0 | 1.8 | 100 | 0.3 | 88 |
| II | 4.0 | 1.8 | 100 | 0.3 | 90 |
| III | 5.0 | 1.7 | 133 | 0.4 | 97 |

EXAMPLE VIII

As stated above, various types of starch may be suitably treated here to yield batter starches of excellent adhesion rating.

Here 100 grams of white milo starch was slurried to a concentration of 20° Baumé by means of distilled water. Dilute hydrochloric acid was added until the pH was reduced to 2.0. A dilute solution of sodium hypochlorite was added in an amount which was equivalent to 0.3 percent available chlorine based on the starch solids. As the pH rose due to the alkali present in the sodium hypochlorate, additional hydrochloric acid was added to maintain the pH between 2.0 and 2.5. After the addition was complete, the reaction was allowed to proceed 30 additional minutes, after which time 5 ml. of 0.3 percent hydrogen peroxide was added. The pH was adjusted to 6.0 the treated starch material filtered, washed, and dried in a forced air dryer. Excellent adhesion ratings were obtained by utilizing this starch as a food breading batter.

EXAMPLE IX

Example VIII was repeated with the exception that German rice starch was treated instead of white milo starch. The treated starch had an adhesion rating of 90 percent while the parent German rice starch had an adhesion rating of 35 percent.

EXAMPLE X

The procedure of example VIII was repeated with the exception that potato starch was the sample undergoing treatment. The treated starch had an adhesion rating of 90 percent compared to the untreated parent starch which had an adhesion rating of 45 percent.

In summary, as shown above, the process of the instant invention provides vastly improved batter mix compositions for use in preparation of breaded, deep-fried foods. In particular, superior adhesion results have been achieved via a simple and inexpensive manufacturing process.

While the invention has been described in connection with specific embodiments thereof, it will be understood that it is capable of further modification, and this application is intended to cover any variations, uses, or adaptations of the invention following, in general, the principles of the invention and including such departures from the present disclosure as come within known or customary practice in the art to which the invention pertains and as may be applied to the essential features hereinbefore set forth, and as fall within the scope of the invention and the limits of the appended claims.

The invention is hereby claimed as follows:

1. A method for the preparation of a batter starch useful in the preparation of breaded deep-fried foods comprising forming an aqueous slurry of raw granular starch, adding sodium hypochlorite to said slurry while maintaining the pH within the range of about 2 to about 6 so as to form hypochlorous acid and chlorine, then treating said slurry with an oxidizing agent which is a weaker oxidizing agent than the mixture of hypochlorous acid and chlorine.

2. The method of claim 1 wherein said oxidizing agent is hydrogen peroxide.

3. The method of claim 1 wherein the temperature is maintained within the range of about 20° C. to about 60° C.

4. The method of claim 1 wherein the several steps are carried out within a period of time ranging from about a few seconds to about 5 hours.

5. The batter starch product prepared in accordance with the method of claim 37.

6. The method of claim 1 wherein, subsequent to the addition of the oxidizing agent, the pH of the slurry is adjusted to a value within the range of about 5 to about 7, by the addition of base.

7. The method of claim 1 wherein the sodium hypochlorite is generated in situ by the addition of sodium chloride followed by subjecting the resulting aqueous slurry to an electrical current.

8. The method of preparing a batter starch useful in the preparation of breaded deep-fried foods which comprises the steps of forming an aqueous slurry of starch contaminant 10–40 percent starch solids, adjusting the pH of said slurry within a range of from about 2 to about 6, adding sodium hypochlorite to said acidic starch slurry over a period of time ranging from about 1 to about 120 minutes, holding said sodium hypochlorite-treated starch slurry for a few seconds up to 120 minutes at a temperature ranging from about 20 to about 60° C., and adding at least a neutralizing amount of hydrogen peroxide to neutralize the excess chlorine released during said sodium hypochlorite treatment step.

9. The method of claim 8 wherein less than a neutralizing amount of hydrogen peroxide is added.

10. The method of claim 8 wherein an excess of hydrogen peroxide is added over that amount necessary to neutralize the chlorine released.